United States Patent [19]

Hess

[11] 4,250,963
[45] Feb. 17, 1981

[54] SELECTIVE PERMEABILITY REDUCTION WITH POLYMERIZABLE MONOMERS AROUND STEAM INJECTION WELLS

[75] Inventor: Patrick H. Hess, Diamond Bar, Calif.

[73] Assignee: Chevron Research Company, San Francisco, Calif.

[21] Appl. No.: 27,537

[22] Filed: Apr. 5, 1979

[51] Int. Cl.³ .................... E21B 33/138; E21B 43/24
[52] U.S. Cl. ................................. 166/288; 166/272; 166/295; 166/303
[58] Field of Search ................ 166/272, 288, 295, 303

[56] References Cited

U.S. PATENT DOCUMENTS

| | | | |
|---|---|---|---|
| 2,272,673 | 2/1942 | Kennedy | 166/272 X |
| 2,274,297 | 2/1942 | Irons et al. | 166/288 |
| 2,799,341 | 7/1957 | Maly | 166/303 X |
| 3,180,414 | 4/1965 | Parker | 166/303 X |
| 3,369,603 | 2/1968 | Trantham | 166/272 X |
| 3,373,812 | 3/1968 | Smith | 166/288 |

Primary Examiner—James A. Leppink
Assistant Examiner—George A. Suchfield
Attorney, Agent, or Firm—R. L. Freeland, Jr.; G. W. Wasson

[57] ABSTRACT

A method is proposed for treating subsurface earth formations in the neighborhood of a steam injection well by selectively altering the effective permeability of the formation through depositing a monomer within the formation where the permeability is to be controlled and the eventual polymerization of that monomer to produce a high-viscosity polymer within the formation to effectively decrease the permeability of that portion of the formation. The monomer is transported to the subsurface formation in vapor form with steam. The mixed vapor first condenses out liquid water only and later condenses out water and immiscible liquid monomer. The polymerization of the monomer then takes place to produce a high-viscosity polymer within the subsurface formation.

13 Claims, 1 Drawing Figure

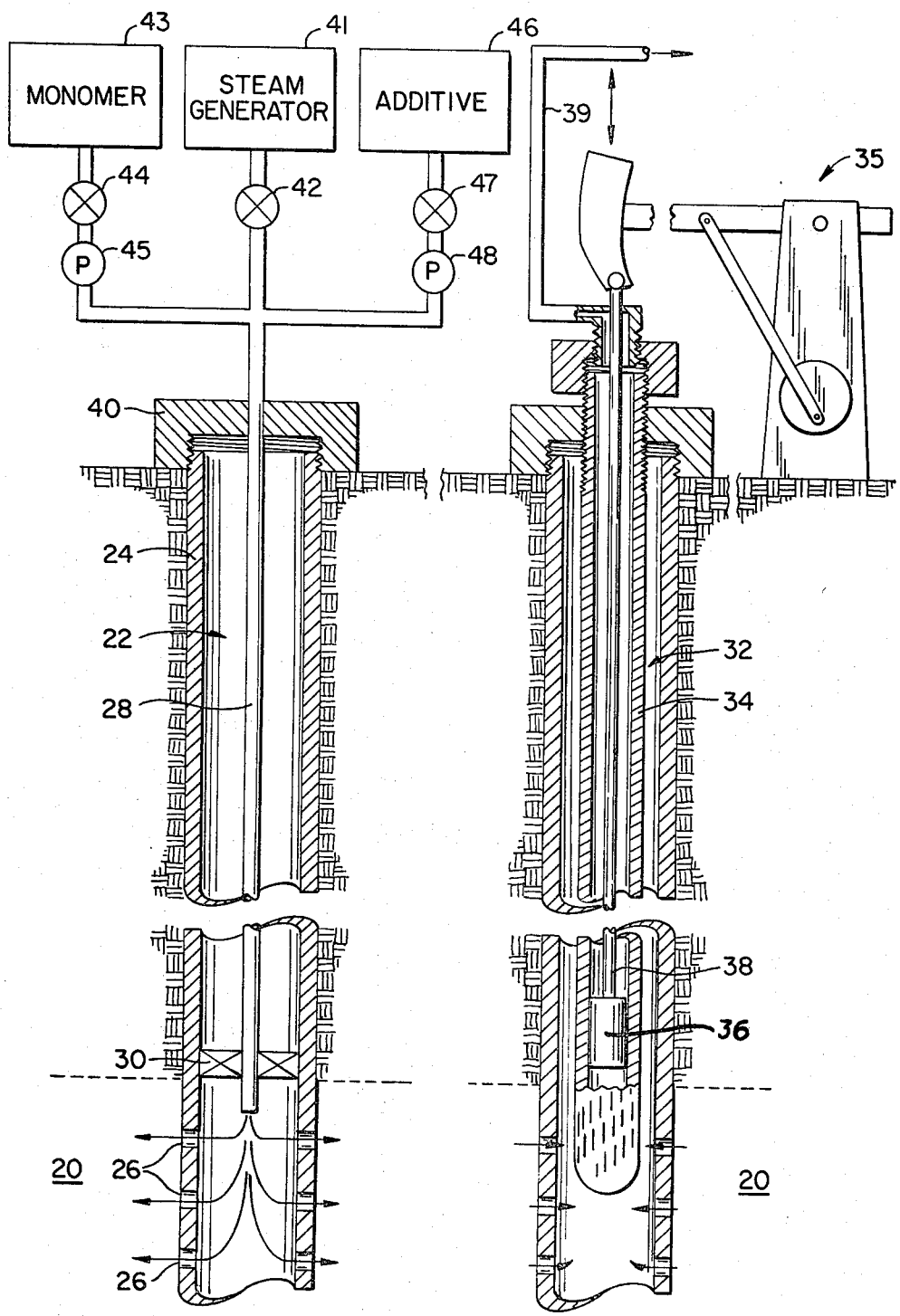
FIG._1.

SELECTIVE PERMEABILITY REDUCTION WITH POLYMERIZABLE MONOMERS AROUND STEAM INJECTION WELLS

FIELD OF THE INVENTION

The present invention relates to improving the efficiency of a steam drive or steam stimulation in the assisted recovery of hydrocarbons. Steam flooding of subsurface hydrocarbon-containing formations has been used to produce the hydrocarbons which exist in very heavy or viscous form. The heating is performed with steam to bring the hydrocarbons to a condition of mobility where they will flow either by gravity or by formation pressure gradients, either natural or imposed, to a producing well for transport to the earth's surface. The greatest efficiency in such steam flooding operations is accomplished if the formation around the steam injection well is uniformly heated as the steam moves out from the wellbore. Inefficiency occurs if one portion of the formation is more permeable than other portions so as to sidetrack a large portion of the steam through the more permeable portion, thus causing non-uniform heating of the remainder of the formation. A means for selectively affecting the permeability of the subsurface formation is therefore desirable.

BACKGROUND OF THE INVENTION

Heretofore, methods have been proposed for treating subsurface earth formations for the purpose of reducing the rate of movement of the fluid materials through selected parts of the formation. Included in the prior art technologies are the in-place formation of gels, either by surface prepared materials that are pumped into the well to become operative at a particular time after their first introduction into the well or by the introduction of several components at different times with an introduction procedure that combines one or more of the materials in the formation where the selective permeability reduction may be desired. Most of these prior art systems have been somewhat ineffective because of the inability to control the actual placement of the materials into the position in the formation where the formation treatment is desired.

BRIEF STATEMENT OF INVENTION

In accordance with the present invention, in a steam-flooding production process a material is transported from the earth's surface to the subsurface earth formation with the steam that is being used to steam-flood the formation. The material is intended for effectively controlling the permeability of the subsurface formation at the location where the permeability is to be controlled. The steam carries the material to that location. The existence of a temperature gradient in lateral distance from the steam injection well is employed to selectively condense the carrier steam and thus place the carried material. The placed material is immiscible with the water phase of the condensed steam and is operable to selectively plug or control the permeability of the formation where it is placed.

PRINCIPAL OBJECT OF THE INVENTION

The principal object of the present invention is to provide a method and apparatus for treating subsurface earth formations at subsurface distances from a steam injection well to alter selectively the effective permeability of the formation.

A further object of the present invention is the method of positioning a monomer within a subsurface earth formation at a subsurface distance from a steam injection well so as to place the monomer in a position where the effective permeability of a formation is to be controlled.

A further object of the present invention is the transportation of a monomer in a continuous vapor phase with steam into subsurface earth formations where the monomer may be selectively condensed from and separated from the condensed steam.

A further object of the present invention is the positioning of a monomer within the subsurface earth formations at a distance from a steam injection well where the monomer may be polymerized to form a high-viscosity polymer for substantially decreasing the effective permeability of the subsurface earth formation.

BRIEF DESCRIPTION OF THE DRAWING

FIG. 1 is a schematic elevational view, partially in section, illustrating apparatus which may be used to perform the method of the present invention.

Referring now to the drawing, FIG. 1 illustrates a preferred embodiment of apparatus assembled in accordance with the present invention for accomplishing the method herein claimed and described. While it is recognized that the method of the present invention can be accomplished using a variety of apparatus, it is preferred that the apparatus used in performing the method of the present invention be assembled in accordance with that illustrated in FIG. 1. As shown in FIG. 1, a producing formation 20 is penetrated by an injection well 22 which may be cased with a casing 24 having perforations 26 at the location of the producing formation. A flow tube 28 is arranged in the well 22 to provide a flow path for steam down the well to the producing zone 20. In most applications, it is desirable to have a packer 30 located above and close to the producing formation 20.

At least one producing well 32, which also penetrates the producing formation 20, is required in accordance with the present invention. In actual field operations, the method of the present invention will generally utilize a large number of wells with injection wells and the producing wells positioned in accordance with a pre-planned pattern. For example, a 5-spot or 7-spot pattern may be useful in the present invention. In any event, each producing well 32 has suitable producing equipment such as a string of producing tubing 34, the lower end of which contains a pump 36. The pump is operated by conventional surface equipment 35 which reciprocates a sucker rod 38 to lift the hydrocarbons to gathering lines 39 at the surface. In accordance with the present invention, steam is injected into the subsurface formations and the hydrocarbons within the formation are heated by the injected steam and are caused to flow toward the producing well 32 there to be lifted to the earth's surface for distribution.

The improvement proposed by the present invention is the addition of a polymerizable monomer to the injected stream and the positioning of the monomer within the formation in a predetermined location. The invention also contemplates the addition of other additives to the injected steam. Schematically FIG. 1 illustrates surface elements for accomplishing the proposed improvement.

The previously described casing 24 is secured to a well head 40 at the earth's surface. Flow tube 28 passes through the well head. A steam generator 41 is connected through a valve 42 to the flow tube 28. A source of monomer 43 is connected through a valve 44 and a pump 45 to the flow tube 28 downstream from valve 42. A source of additive 46 is connected through a valve 47 and a pump 48 to the flow tube 28 downstream from the valve 42. It should be understood that the steam generator 41 will include the necessary controls to produce steam at a desired temperature, pressure and/or quality and that the sources of both monomer 43 and additive 46 are merely schematic illustrations of sources that may supply vapor, liquid or solid materials as needed. Pumps 45 and 48 for the monomer and additive respectively are provided to produce a supply of each material to the flow tube 28 at the pressure of the steam supplied from the steam generator.

The method of the present invention may be used with steam drive or steam stimulation techniques which use continuous steam injection from one or more injection wells as well as techniques which use interruption of the steam injection, as for instance huff-and-puff techniques, and steam soaking techniques where steam is injected to establish and maintain an elevated formation temperature for extended periods of time followed by subsequent production of subsurface petroleum from the heated formation. Valves 42, 44, and 47 and pumps 45 and 48 are provided with suitable mechanisms to accomplish control of the injection of steam and the introduction of monomer and additive.

DETAILED DESCRIPTION OF THE INVENTION

To understand the details of the method of the present invention it is first necessary to understand a few more details of the problem being solved. Steam injected into an oil-producing formation performs two principal desirable functions. In the first place, it heats the formation rock and the oil and water contained within the formation. The heating of the oil lowers its viscosity so the oil therefore flows more readily toward the nearby producing well (or wells). In the second place, the steam itself performs a pushing function. In the ideal case, the steam (and its condensate) stays behind the oil, pushing the oil toward the producing wells. In actual, non-ideal cases, part of the steam tends to bypass the oil. This non-ideal behavior occurs for at least two different reasons. The first reason is that the steam is less dense than the oil and it therefore tends to flow toward the top of the formation. The steam being in the top of the formation will then push ahead of it only the oil in the upper part of the formation. The second reason is that actual oil-containing formations are heterogeneous in permeability; and the boundary between a pushed fluid and a pushing fluid moves faster in more permeable regions of the formation. This makes the more permeable regions contain higher proportions of the less viscous pushing fluid than do the less permeable regions, and this, in turn, makes the flow relatively still faster in those more permeable regions, so the boundary between the two fluids "fingers" into the more permeable regions, tending to bypass oil in the less permeable regions.

For the above reasons a method is needed to decrease the effective permeability of the parts of the formation into which the steam tends to flow most readily, without decreasing the effective permeability of the other parts of the formation that the steam is tending to bypass. More particularly, after a steam injection has been in operation for an initial period, a method is needed that will decrease the effective permeability of parts of the formation into which the steam has already advanced the farthest, without decreasing the permeability of the preceding parts of the formation and the parts that the steam has already tended to bypass. The present invention provides such a method.

In the method of the present invention, the permeability-reducing agent is carried with the steam in an inactive state, as far as permeability reduction is concerned, and the agent does not become active for permeability reduction until the formation temperature has declined to a level such that monomer vapor condenses to a liquid in the parts of the formation into which the steam front has advanced. The permeability-reducing agent is a polymerizable monomer carried in the steam as a vapor too dilute to polymerize, but polymerizable after condensation out of the vapor stream as liquid monomer.

In the preferred form of the invention, the steam entering the formation contains the monomer vapor and the phase relationships are such that as the steam begins to cool, the first condensate will be pure water, and only after a certain predetermined lower temperature is reached will a two-phase condensate begin to appear, consisting of liquid water, and an essentially immiscible liquid monomer. At that place and time and temperature, the liquid monomer will begin to polymerize to form a solid (or at least a highly viscous body) in the pores of the reservoir rock, thereby reducing the pore volumes between the grains and reducing the permeability of the pore passages.

To accomplish the desired result in a formation where it is believed that a more permeable region is causing a reduction in the sweep efficiency of a steam drive or stimulation, steam and monomer are injected in vapor phase into the formation so that the combined vapors pass into the more permeable portions of the formation. As the combined vapors pass into the formations and encounter cooler surroundings, the water vapor condenses and the monomer vapor continues until it reaches formations cool enough for the monomer to condense and polymerize as stated.

Under some circumstances, it may be preferred to interrupt the injection of the combined vapors or to interrupt introduction of the monomer or to reduce the steam injection pressure to accomplish the desired placement of the combined vapors in the formation.

Each of these variations is intended to be included in this application as means for getting the combined vapors to the desired portion of a subsurface formation. Once in the formation, the separate vapors condense when they encounter regions which are at that vapor's condensation temperature.

One material that may be used in a method such as described above is styrene, which in liquid state is essentially immiscible with water, but which will vaporize with steam at any temperature above the temperature at which the sum of the styrene vapor pressure and the water vapor pressure equals the ambient pressure. When the mixed vapor is condensed, first producing a condensate of pure water, and then producing a two-phase condensate of liquid water and immiscible liquid styrene, the styrene will thermally polymerize to form polystyrene, a thermoplastic that is solid below about 250° F., and a very viscous melt at higher temperatures.

In a variation of the method sufficient ammonia is added to the boiler feed water or to the steam stream to establish an ammonia concentration in the vapor equivalent to about one percent by weight of the proposed styrene concentration. Ammonia will tend to inhibit any styrene polymerization in the vapor phase.

A possible operating procedure involves metering styrene into the steam stream between the generator and the well head at about one part styrene to four parts water by weight. The styrene will flash evaporate to form a styrene-steam vapor. Upon cooling this vapor will first condense out pure liquid water and later a two-phase liquid mixture of water and immiscible styrene. If ammonia has been added to the stream, part of it will remain in the uncondensed vapor and part of it will be dissolved in the liquid water phase. The styrene droplets will coalesce and undergo thermal polymerization to form polystyrene.

Monomers useful in this invention include monomers that are vaporizable into the steam stream at the injection temperature and pressure, that are condensable within the petroleum-containing formation at the temperature and pressure prevailing in the formation location where permeability alteration is desired, and that are thermally polymerizable in the condensed state at the temperature prevailing in the formation location where permeability alteration is desired. Preferred monomers are essentially immiscible with water in the condensed state at temperatures and pressures of interest.

Monomers useful in this invention can be further categorized by considering the phenomena involved. The vaporization and condensation equilibria for immiscible liquids are discussed by Barnett F. Dodge, "Chemical Engineering Thermodynamics", McGraw-Hill Book Company, Inc., New York, 1944, pp 533–535. The equilibrium vapor pressure over a mixture of immiscible liquids, such as styrene and water, is the sum of the vapor pressures of the individual components. The system boiling point temperature is independent of the liquid composition and is the temperature at which the sum of the vapor pressures of the pure components equals the total pressure. This phenomenon is important in that monomers with boiling point temperatures considerably higher than the boiling point temperature of water can be useful in this invention.

From the discussions above, limits may be set that will better define monomers useful in the invention. The monomer and water should be chemically nonreactive with each other in the liquid and vapor states, and should be essentially immiscible in the liquid state over the temperature range of interest (say 60°–600° F.). Any water-immiscible monomer with a vapor pressure can be vaporized into a steam stream. For practicality, a monomer that has a three-phase equilibrium point (for the meaning of this point see Dodge, loc. cit.) vapor monomer content of at least 10 wt. percent would be preferred so that the condensed monomer phase will be of sufficient local volume to effectively reduce the permeability. For a monomer with a molecular weight of 80, the corresponding three-phase equilibrium point composition data are shown in Table 1.

TABLE 1

| Monomer, Wt. % | Monomer, Mole % | Vapor Pressure, % of Total Pressure |
|---|---|---|
| 50 | 22.5 | 22.5 |
| 20 | 5.6 | 5.6 |

TABLE 1-continued

| Monomer, Wt. % | Monomer, Mole % | Vapor Pressure, % of Total Pressure |
|---|---|---|
| 10 | 2.5 | 2.5 |

Thus a monomer useful in the invention would have as an upper limit a vapor pressure on the order of 2.5% or preferably 5.6% of the total system pressure (the system temperature and pressure are established by the saturated steam injection stream). At a saturated steam pressure of 1 atmosphere (212° F.) the monomer vapor pressure would then be on the order of 19 mm or preferably 43 mm Hg or greater. Thus some monomers with 1 atmosphere boiling temperatures as high as 400° F. would be useful in the invention.

A lower boiling point limit for monomers useful in the invention is established by considering the formation temperature in which the monomer must condense. Thus the lower boiling point limit for a monomer useful in the invention would be several degrees F. above the original reservoir temperature at the pressure existing within the condensation region.

The remaining requirement for monomers useful in the invention is that the monomers must be thermally polymerizable at the temperatures of interest. The rates of polymerization are not too important. An immediate or "flash" polymerization would be undesirable because the condensed monomer would not have time to coalesce into a bulk phase. However, no common monomers that meet the other monomer requirements will "flash" polymerize under thermal initiation. Polymerizations extending over days or weeks may not be detrimental in that low molecular weight polymers may be as effective as higher molecular weight polymers in permeability reduction.

Type of monomers that may be useful in this invention are: vinyl compounds such as styrene and ring-substituted styrene, 2-vinyl pyridine, 2-methyl-5-vinyl pyridine; vinyl esters such as vinyl butyrate, vinyl-2-ethylhexanoate; vinyl ethers such as vinyl butylether, vinyl 2-ethylhexyl ether; acrylates such as acrylonitrile, acrylic and methacrylic acid esters; dienes such as isoprene, chloroprene, 2-ethyl-1,3-butadiene; acetylenes such as phenyl acetylene and phenoxy acetylene. Combinations of monomers may also be used effectively.

A preferred monomer in the invention is styrene, preferred for its chemical and physical properties, its ready availability, and low cost. Selected properties of styrene are listed in Table 2. Table 3 lists data on the styrene-water system.

TABLE 2

| STYRENE (VINYLBENZENE) PHYSICAL AND CHEMICAL PROPERTIES | | |
|---|---|---|
| Formula | | $C_6H_5CH:CH_2$ |
| Molecular Weight | | 104.144 |
| Boiling Point, 1 atm. | 145.2° C. | 293.4° F. |
| Freezing Point in Air, 1 atm. | −30.6° C. | −23.1° F. |
| Critical Temperature | 641° K. | |
| Critical Pressure | 575 psia | |
| Vapor Pressure | log $P_{mmHg}$ = 6.95711−1445.58/(t°C. + 209.43) | |
| At 200° C. | 51.64 psia | |
| Liquid Density, g./ml. | $d_t$ = 0.9238−0.0008766 t(°C.) | |
| 25° C. | 0.9019 | |
| 200° C. | 0.7485 | |
| Viscosity, cp at 25° C. | 0.730 | |
| Heat Capacity, Liquid, 25−200° C., Cal/g/°C. | 0.525 Average | |
| Heat of Vaporization, 200° C., Cal/g. | approx. 80 | |
| Heat of Polymerization, Cal/g, 25° C. | 160.2 | |

TABLE 2-continued

STYRENE (VINYLBENZENE)
PHYSICAL AND CHEMICAL PROPERTIES

| Volume Shrinkage on Polymerization | 17% |
| --- | --- |

TABLE 3

STYRENE-WATER SYSTEM DATA

| | Vapor Pressure | | | | | |
| --- | --- | --- | --- | --- | --- | --- |
| | 100mm | 200mm | 400mm | 760mm | 50 psia | 500 psia |
| Water, t°F. | 125 | 152 | 181 | 212 | 281 | 467 |
| Styrene, t°F. | 180 | 214 | 252 | 293 | 389 | — |

Polymer Properties

Thermal polymerization of styrene monomer at 392° F. should lead to polystyrene with a weight average molecular weight near 25,000. In the absence of oxygen, this polymer should be relatively stable at temperatures below 500° F. Melt viscosity may be on the order of 5000 centipoises.

To indicate the behavior that may be expected in the field using styrene with steam, several laboratory experiments were performed.

Styrene and water were codistilled through a short path distillation apparatus, with minimum reflux, at temperatures near 200° F. Distillations were done with and without added ammonia in the system. No evidence of polymerization was noted in the distillation flask or still head. Collected distillate separated into two liquid phases. Nuclear magnetic resonance (NMR) spectra of the collected styrene layer gave no indication of compounds other than styrene monomer (NMR detects as little as 0.5 weight percent polystyrene in styrene solution). After several days at room temperature, the uninhibited styrene distillate had polymerized to a syrupy stage.

A 4.5 inch, 40×60 mesh sand pack in a Hassler cell was heated to 275° F., and steam at 220° F. was injected for some time to establish rate. Styrene (30 ml) was then metered into the steam stream to produce a 10% by volume vapor. The pack effluent, still vaporized, was condensed. Almost all of the injected styrene was recovered as distillate. NMR indicated no polystyrene in the distillate. No indication of polystyrene was found in the sand pack.

Styrene and water, with and without ammonia added, were heated at 392° F. in Hoke bombs under autogeneous pressure. After heating two hours, the bombs were cooled to room temperature and opened. In all cases the styrene layer had polymerized to hard, glassy polystyrene.

A 60-inch, 40×60 mesh sand pack in a Hassler cell was used for the following experiment. About one pore volume (liquid basis) of steam was injected into the cold sand pack to warm it up and establish injection rates. All effluent collected was cool, liquid water. A 10% styrene—90% steam stream was injected until 20 ml styrene was in the sand pack. No styrene was noted in the effluent. Injection was then stopped, the ends of the sand pack were plugged, and the Hassler cell was heated at 230° F. for 10 hours. The cooled sand pack was not consolidated, but sand grains were stuck together. Polystyrene was identified by NMR.

At room temperature, water was injected through 4.5 inch, 40×60 mesh sand packs to establish initial permeability. Liquid styrene and water were coinjected at equal volumetric rates, with and without ammonia added, until styrene was obvious in the effluent fluid. The sand packs were then plugged at both ends and heated for 16 hours at 300° F. After cooling, solid polystyrene was cleaned from the end plugs and water permeability was measured. In both cases, permeability reduction was about 75%. The sand packs were found to be consolidated with polystyrene; the consolidated sands were quite friable.

These experiments show that styrene monomer polymerizes in the presence of water and ammonia (1) in the bulk liquid state at 392° F., (2) after condensation in a sand pack at 230° F., (3) as bulk liquid in a sand pack at 300° F. They also show that a styrene-water vapor stream can pass through a short sand pack at 275° F. with no apparent styrene polymerization.

While a certain preferred embodiment of the invention has been specifically disclosed it is understood that the invention is not limited thereto as many variations will be readily apparent to those skilled in the art and the invention is to be given its broadest possible interpretation within the terms of the following claims.

What is claimed is:

1. A method for treating a subsurface earth formation in the neighborhood of a steam injection well to alter selectively the effective permeability of said formation, comprising the steps of:
   (a) producing a vapor mixture consisting of steam and the vapor of a polymerizable monomer, said monomer in liquid state being immiscible with water, the steam being in excess so that at the pressures and temperatures of said subsurface earth formation being treated the first condensate will consist of water only; and
   (b) injecting said mixture into said subsurface earth formation being treated so that within said subsurface earth formation being treated the initial cooling of said vapor causes excess steam to condense out of said vapor, and after further cooling said monomer will begin to condense and deposit a separate immiscible phase, whereby said condensed monomer will polymerize to become a high-viscosity polymer, thereby substantially decreasing the effective permeability of said subsurface earth formation where said polymer has been deposited.

2. The method of claim 1 wherein said monomer is added to said steam as a liquid form and is vaporized into said steam to form a vapor mixture whose first condensation product as it cools will consist of liquid water only.

3. The method of claim 1 wherein said monomer is added to said steam in vapor form.

4. The method of claim 1 with the addition of ammonia to said mixture.

5. The method of claim 4 wherein said ammonia is added to establish an ammonia concentration in the mixture equivalent to about 1% by weight of the monomer concentration.

6. The method of claim 1 wherein the monomer is styrene and the mixture of steam and monomer is at a weight ratio of about 1 to 4 of monomer to steam.

7. The method of treating a subsurface earth formation to selectively control the effective permeability therein, comprising the steps of:
   (a) producing steam and injecting said steam into said subsurface earth formation at a temperature and pressure that will cause said steam to be a vapor at the subsurface formation whose effective permeability is to be controlled;

(b) vaporizing a polymerizable monomer into said produced steam so as to form a mixture of steam and monomer and injecting said mixture into said subsurface earth formation;

(c) terminating the addition of monomer to said steam while continuing to inject steam to drive said mixture into said subsurface earth formation so as to cause said mixture to be placed within said subsurface earth formation in said formation whose effective permeability is to be controlled;

so that said injected mixture will condense within said subsurface earth formation to produce a liquid water phase and a liquid monomer phase within said subsurface earth formation whose effective permeability is to be controlled and so that said monomer will polymerize within said formation to form a high-viscosity polymer within said formation to reduce the effective permeability thereof.

8. The method of claim 7 wherein said monomer has a boiling point at atmospheric pressure within the range of about 60° F. to 400° F.

9. In the recovery of subsurface petroleum by steam injection into a petroleum-containing formation, the method of increasing the sweep efficiency of the steam injection, comprising:

adding to the injected steam a monomer, said monomer being:

(a) vaporizable into the steam at the injection pressure and temperature;

(b) condensable at the prevailing temperatures and pressures within the petroleum-containing formation; and (c) thermally polymerizable in the condensed state at the prevailing temperatures and pressures within the petroleum-containing formation.

10. The method of claim 9 in which said monomer in its liquid phase is immiscible with water.

11. In the recovery of subsurface petroleum by steam injection into a subsurface petroleum containing formation the method of increasing the sweep efficiency of the steam injection comprising:

(a) adding styrene monomer vapor to the injected steam, (b) injecting said steam containing said styrene monomer down a wellbore into said subsurface petroleum containing formation, (c) and recovering petroleum from said subsurface formation.

12. The method of claim 11 in which the concentration of styrene monomer vapor in the injected steam is kept below that concentration at which liquid styrene could exist in equilibrium with the composite vapor of water and styrene.

13. The method of claim 11 in which ammonia is added to the styrene-containing steam to inhibit the vapor-phase polymerization of styrene during passage of the styrene-containing steam down said wellbore and into said subsurface petroleum containing formation.

* * * * *